Dec. 27, 1938. J. M. ANGELETTI 2,141,235
PROCESS AND APPARATUS FOR MAKING ARCUATELY PLAITED PRODUCTS
Filed Aug. 20, 1935 5 Sheets-Sheet 1

INVENTOR,
Joseph M. Angeletti,
BY
ATTORNEY.

Dec. 27, 1938.  J. M. ANGELETTI  2,141,235
PROCESS AND APPARATUS FOR MAKING ARCUATELY PLAITED PRODUCTS
Filed Aug. 20, 1935   5 Sheets-Sheet 2

INVENTOR,
Joseph M. Angeletti,
BY
Thomas G. Steward,
ATTORNEY.

Dec. 27, 1938.   J. M. ANGELETTI   2,141,235
PROCESS AND APPARATUS FOR MAKING ARCUATELY PLAITED PRODUCTS
Filed Aug. 20, 1935   5 Sheets-Sheet 5

INVENTOR,
Joseph M. Angeletti,
BY
ATTORNEY.

Patented Dec. 27, 1938

2,141,235

UNITED STATES PATENT OFFICE 2,141,235

PROCESS AND APPARATUS FOR MAKING ARCUATELY PLAITED PRODUCTS

Joseph M. Angeletti, Alexandria, Ind., assignor to Aladdin Industries, Incorporated, Chicago, Ill., a corporation of Illinois Application August 20, 1935, Serial No. 36,982

10 Claims. (Cl. 93—1)

The invention relates to the art of forming paper or other suitable sheet material and, particularly, to the art of plaiting such materials to form a plaited sheet, and producing from the plaited sheet a variety of useful and decorative articles. The art of plaiting paper and similar material is an old art and a wide variety of articles made from such plaited materials are in common use today.

Because of the nature of the material commonly employed in the manufacture of these plaited articles, the plaits themselves have always been straight, or in cases where they were curved, as for example certain types of decorative candle shades, the concave edge of each plait was corrugated to take up the excess of paper resulting from the curvature.

When straight-plaited material is used, there is a severe limitation upon the forms that can be produced in the finished articles. The straight-plaited material can only be employed in cylindrical and frustro-conical shapes, and the edges of the plaits must run parallel to the elements of the cylindrical or conical surface. In previous attempts to produce curved plaits, in which the concave edges of the plaits were corrugated in order to take up the excess of material, there was the further limitation that the curved plaits had to be maintained quite close together to prevent the inside concave edges of the plaits from being deformed. Additionally, these internally corrugated curved plaits could be successfully produced only in relatively thin, and therefore flimsy, material.

The present invention provides a method for producing curved or arcuate plaits in heavy materials, such for example as paper .014 or .016 inch in thickness. It is an object of the invention to provide a method for producing such plaited material, in which no corrugation is necessary or desirable on the concave edges of the plaits. An additional object is to provide a method for producing arcuate plaits in which the surfaces of the plaits will form true warped surfaces when the plaits are expanded without any tendency to wrinkle, buckle or otherwise deform.

Particularly, it is an object of the present invention to provide a method for producing true arcuate plaits in heavy parchmentized paper, the product being adapted to the making of new and interesting forms of parchment lamp shades for electric lamps, kerosene lamps and gas lamps, whether of the fixture or portable type.

The process of producing arcuately plaited strip material herein disclosed also has additional advantageous uses. For example, it may be employed to produce curved plaited packing members for shipping glassware and similar fragile products, manufactured to conform to the shape of the article with which it is to be used.

Having formed the arcuately plaited blank, it remains only to join the edges of the blank by any suitable method in order to produce an annular article having an exterior surface curved not only circumferentially but also in an axial direction. It will be at once appreciated that a wide variety of new, useful and decorative articles may thus be produced.

The problem involved in producing curved or arcuate plaits in paper and similar materials arises through the fact that in order to conform to the desired curve, a portion of the paper in each plait must be stretched while another portion is, at least to some extent, compressed. Since paper and similar materials are commonly of such nature that any attempt to stretch them is more likely to rupture the material than to produce any actual displacement of the fibers, the process of the present invention is primarily intended to produce an actual though slight change in the length of certain portions of a strip or similar material without tearing or rupturing the material.

The present invention provides a process for producing arcuately plaited strip material which does not require the construction of expensive special gear-like forming tools for producing each new curvature in the plaits. In the present process, the arcuation of the plaits is preferably produced in a power punch press, but a simple and inexpensive hand-operated pressing machine may easily be constructed to perform the arcuation.

The process of my present invention is especially suited to those cases in which the production of any one form of arcuately plaited material will be relatively small. By the present process, a variety of different forms may be readily produced with only nominal expense for additional equipment and for the construction or adaptation of the machines.

The present invention also includes the apparatus below described for effecting the operation of the process of the invention. The novel product of said process is not claimed herein, as it forms the subject matter of a copending divisional application filed in the United States Patent Office June 25, 1938.

My invention will be better understood by reference to the accompanying drawings which show machines suitable for carrying out my process and for manufacturing in quantity the product of my process and which also illustrate some of the products themselves and in which:—

In accordance with the present invention, the material to be arcuately plaited may be first straight-plaited in a machine of the type already well known in the art. In a preferred arrangement for carrying out my process, however, I include in this machine means for compressing the plaits so that the bends in the edges of the plaits are substantially 180° bends. I also include in this machine means for cutting off the straight-plaited material into blanks of suitable length. In the usual case, these blanks are of sufficient length to make several of the intended articles. The number of plaits in each blank will be a multiple of the number required for each article, the total number depending upon the dimensions of the pressure block and die used for producing the arcuation.

The blanks thus formed are then placed in the die and an adjustable side wall of the die is advanced so as to tightly compress the plaited material. The pressure block is then brought down with a gradual stroke. Since the plaited material is prevented from buckling or wrinkling by the lateral pressure of the side walls of the die and since the pressure block is so formed as not to develop excessive strain at any one point in the paper, the compressed straight plaits are successfully bent into an arcuate form.

The arcuately plaited material may now be cut off into blanks containing the proper number of plaits for the article to be manufactured. The blank is then expanded to a sufficient degree, preferably over a suitable form, and its edges are joined by any suitable method, for example with a cement adapted to the type of material being used. A punched frame of metal or other suitable material may then be applied at either end of the article and suitably secured to its edge. This frame may include suitable means for attachment to the lamp or other device upon which the article is to be used.

It will be understood that any desired color or form of decoration may be employed on the sheet material. This color is applied preferably before the material is plaited, but other and very striking effects can be obtained by applying the color to the completed article. If the color be applied by spraying and the spray of color is directed tangentially, it will not penetrate to the bottom of the plaits and various pleasing effects can thus be secured. The frame employed at the top or bottom of the article also may be suitably colored or decorated.

Additionally, very unusual effects are secured by first folding a strip of material lengthwise before it is straight-plaited, thus producing a plaited blank of double thickness. After these double plaits have been arcuated, the two layers may be separated to produce forms having one convex and one concave surface.

Figure 1:
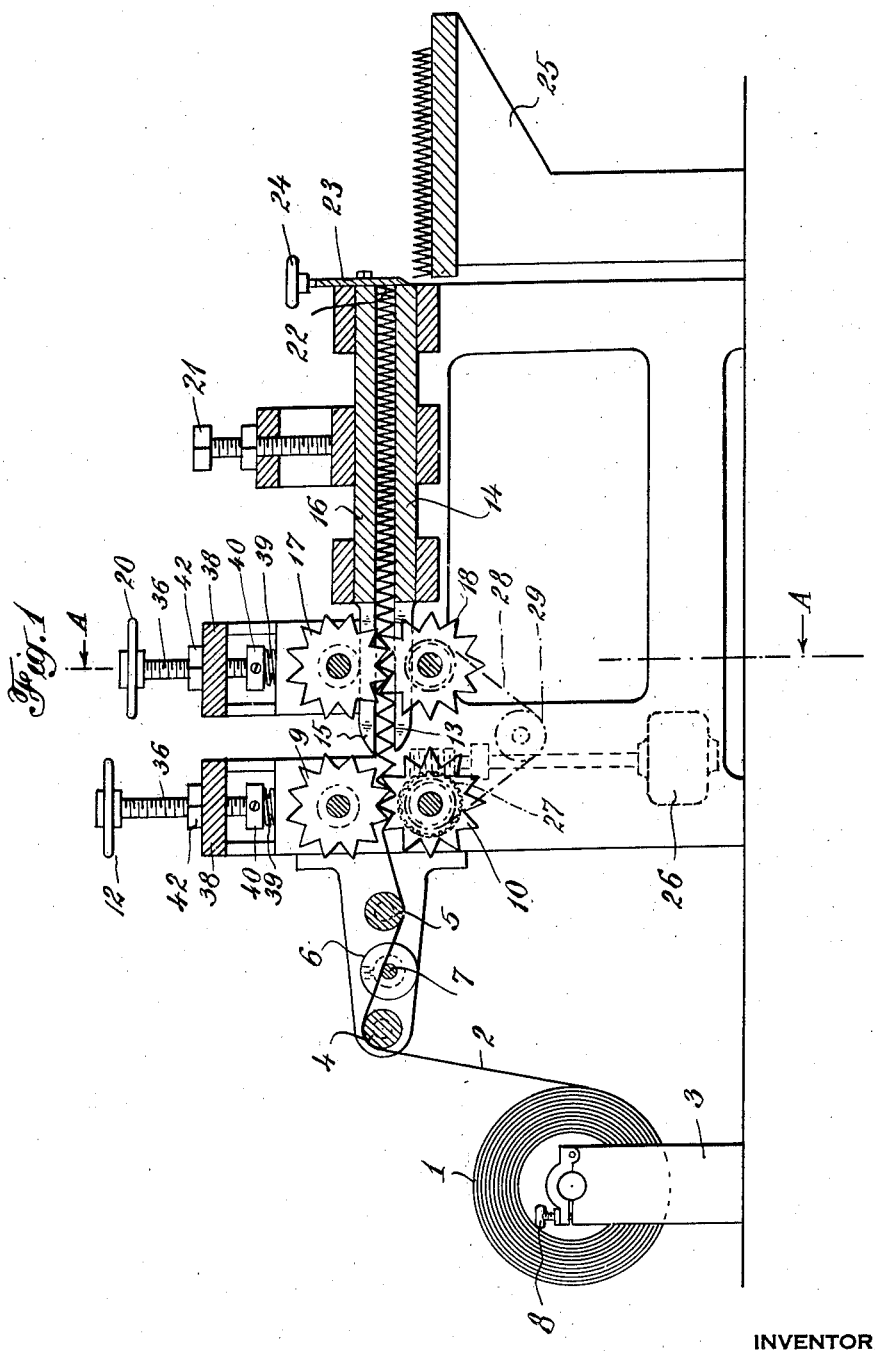
Fig. 1 is an elevation partly in section of a machine for producing straight plaits in strip material, for compressing the plaits after they have been formed and for cutting off the plaited material into blanks containing a desired number of plaits.

Referring to the drawings, Fig. 1 shows a machine for straight-plaiting the paper, compressing the plaits, and cutting the plaited paper into blanks of suitable length. A roll 1 of the strip material 2 which is to be processed is supported upon suitable trunnions 3, the paper passing over idler roller 4 and under idler roller 5, and being guided by adjustable flanges 6 on the stationary bar 7. The tension may be regulated by thumb screws 8 on trunnions 3. The paper then passes between plaiting rollers 9 and 10, which are so designed as to produce plaits of the desired width, the paper being folded over the edge of one roller and then over the edge of the other roller, and being drawn forward and pushed out from between the rollers by the action of the rollers themselves. The upper roller 9 is arranged so that the vertical pressure on it may be adjusted by means of hand wheels 11 and 12 so as to regulate the space between the rollers 9 and 10 and thus secure correct yieldable pressure for creasing the paper.

The plaited paper, as it leaves the rollers 9 and 10, enters the space between extensions 13 on table 14 and extensions 15 on plait-gathering member 16. Projecting into this space are rollers 17 and 18 which serve to count the plaits and to force them forward between the table 14 and the plait-gathering member 16. Upper roller 17 is vertically adjustable by means of hand wheels 19 and 20 to regulate the space between the rollers 17 and 18. Plait-gathering member 16 is also vertically adjustable by means of pressure screw 21. The member 16 is adjusted so that the space into which the plaited material is forced by the action of rollers 17 and 18 is of just sufficient height to create considerable friction on the edges of the plaits, thus restraining their forward motion. By this arrangement the plaits are compressed in the space between the table 14 and the member 16, but are neverthless continuously pushed forward by the new plaits delivered from the rollers 17 and 18. At 22 the compressed plaits emerge from between the table 14 and the member 16 and a shear blade 23 operated by handle 24 is provided at this point to cut the plaited material into blanks of suitable length.

The machine is driven by motor 26 through worm drive 27 which drives roller 10. Chain 28 drives roller 18 from roller 10 and is provided with an idling sprocket 29. The shear blade 23 blocks opening 22 until a desired number of plaits have accumulated behind it, after which it is operated manually to cut the straight-plaited material into blanks of suitable length. The blanks fall on table 25.

The rollers 9 and 10 are shown as having sharp edges but it will be understood that there should be a small radius not only at the tops of the ridges, but also at the bottoms, the actual radius employed depending upon the nature of the paper or sheet material used and being adjusted to produce a proper crease without breakage or mutilation of the material. It is preferable not to bend the material too sharply between the rollers 9 and 10, but to rely upon rollers 17 and

18 and the subsequent compression, to complete the creasing of the material.

Additionally, and with certain types of material, it will be found desirable to warm the material slightly in order to facilitate the creasing and to prevent rupture of the material at the crease. This warming, however, must not be sufficient to produce any tackiness in the material. If the material is tacky the plaits will tend to adhere when compressed and the surface of the paper may be mutilated when the plaits are finally separated to form the finished article. With a preferred type of impregnated material, a temperature of 110 degrees Fahrenheit has been found to be satisfactory.

Figure 2:
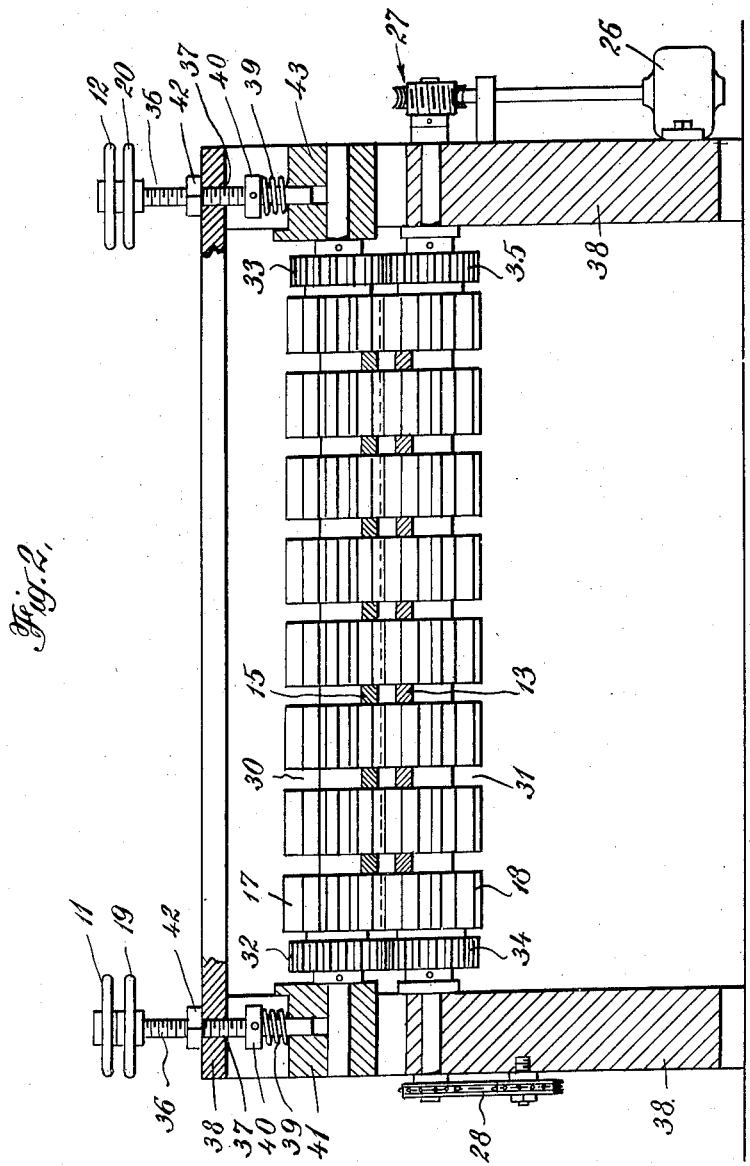
Fig. 2 is a sectional view of the plaiting machine of Fig. 1, taken on the line AA of Fig 1.

Referring to Fig. 2 of the drawings, roller 17 is provided with grooves 30 to receive extensions 15 of member 16. Likewise, roller 18 has grooves 31 to receive extensions 13 of table 14. Gears 32 and 33 at the ends of roller 17 engage respectively with gears 34 and 35 at the ends of roller 18, thus insuring the positive drive of roller 17 from roller 18.

Fig. 2 makes clear the means for maintaining an adjustable vertical pressure on roller 17. Hand wheel 19 is securely attached to screw-threaded rod 36 which passes through a threaded hole 37 in frame 38. The upper end of coil spring 39 bears against collar 40, which is securely attached to rod 36, and the lower end of spring 39 bears against journal box 41, which is movably mounted in frame 38. Lock nut 42 is provided to insure permanency of adjustment. Hand wheel 20 is similarly arranged to adjust the vertical pressure on journal box 43. It will be understood that a similar arrangement is also employed to apply a vertical adjustable and resilient pressure to roller 9 of Fig. 1 by means of hand wheels 11 and 12.

Figure 3:
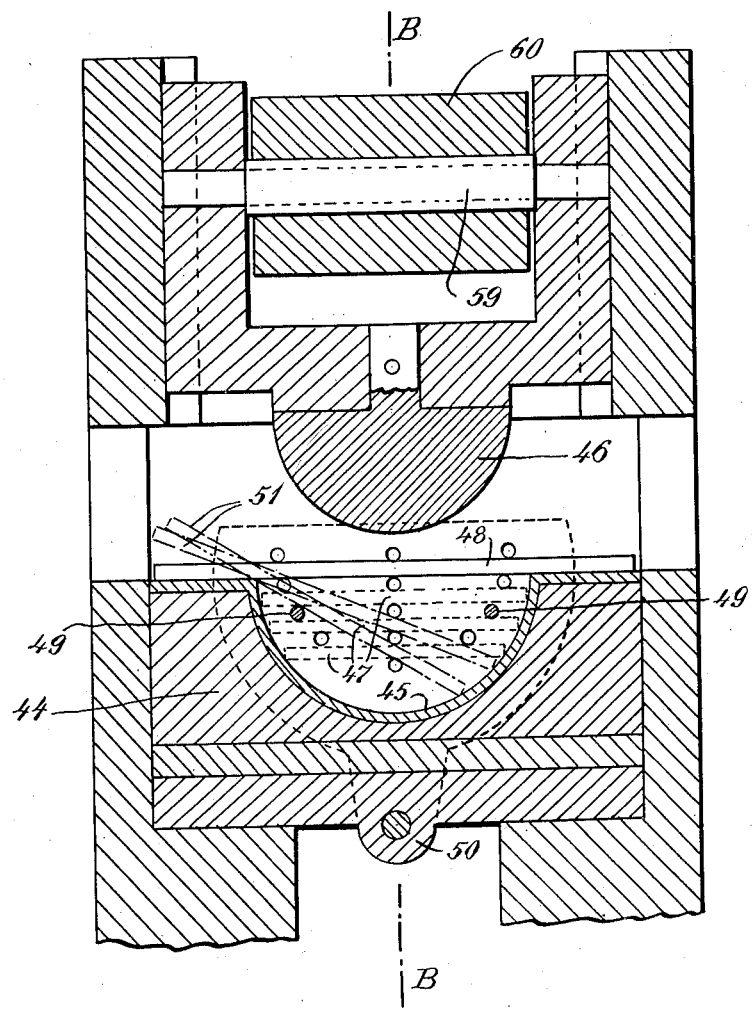
Fig. 3 is a sectional view of a die and pressure block used in the arcuation of the straight-plaited blanks produced by the machine of Figs. 1 and 2.

The compressed plaited blanks delivered to the receiving table 25 in Fig. 1 are now ready to be arcuated. This operation is carried out in a hand-operated or power-driven machine of the punch-press type. A suitable die and pressure block are shown in Fig. 3. The die 44, which may be made of any suitable material, has a curved central depression as shown and is lined with a brass jacket 45. The pressure block 46 has a complementary contour of radius sufficiently smaller than the radius of the curved depression in the die 44 to accommodate the vertical thickness of the compressed plaited material. For example, if the plaits are ⅜ths inch in vertical dimension, the radius of the curved depression of the die 44 will be ⅜ths inch greater than the radius of the pressure block 46. The die is preferably heated to facilitate bending of treated materials.

As indicated by the broken lines, the die and the pressure block of Fig. 3 are designed to accommodate various lengths of compressed plaited blanks. The dotted outlines 47, for example, indicate relatively short plaited blanks before they are arcuated, whereas the solid outline 48 indicates a relatively long plaited blank. Pins 49 held on a plate 50 are inserted through the side wall of the die to support the blank in the die, prior to the application of the pressure exerted by the movable side wall 53 of the die block assembly shown in Fig. 4, preparatory to arcuation. Plates similar to the plate 50 with guide pins similar to the pins 49 may be arranged for supporting various lengths of plaited blanks in the die.

If it is desired to arcuate only the middle portion of the compressed straight-plaited blank, it may be placed in such a position that it projects over the edge of the die at each end, as exemplified by the blank 48. To arcuate only one end of the blank, it is placed in the position indicated by the dotted outlines 51. In either case, the edges of the plaits may be protected from injury at the beginning of the bend by means of a thin strip of paper or other flexible material placed over the edge of the die.

The degree of arcuation of the straight-plaited blank may be varied by checking the downward movement of the pressure block 46 before it reaches the end of its stroke. In this case, the portion of the blank which is first contacted by the pressure block 46 is given an arcuation which corresponds closely to the form of the pressure block, whereas other portions of the blank are given no permanent bend by the arcuating operation. This method of varying the degree of arcuation may be successfully applied irrespective of the initial position of the blank relative to the die, thus making possible the production of numerous forms of product from a single die and pressure block.

Figure 4:
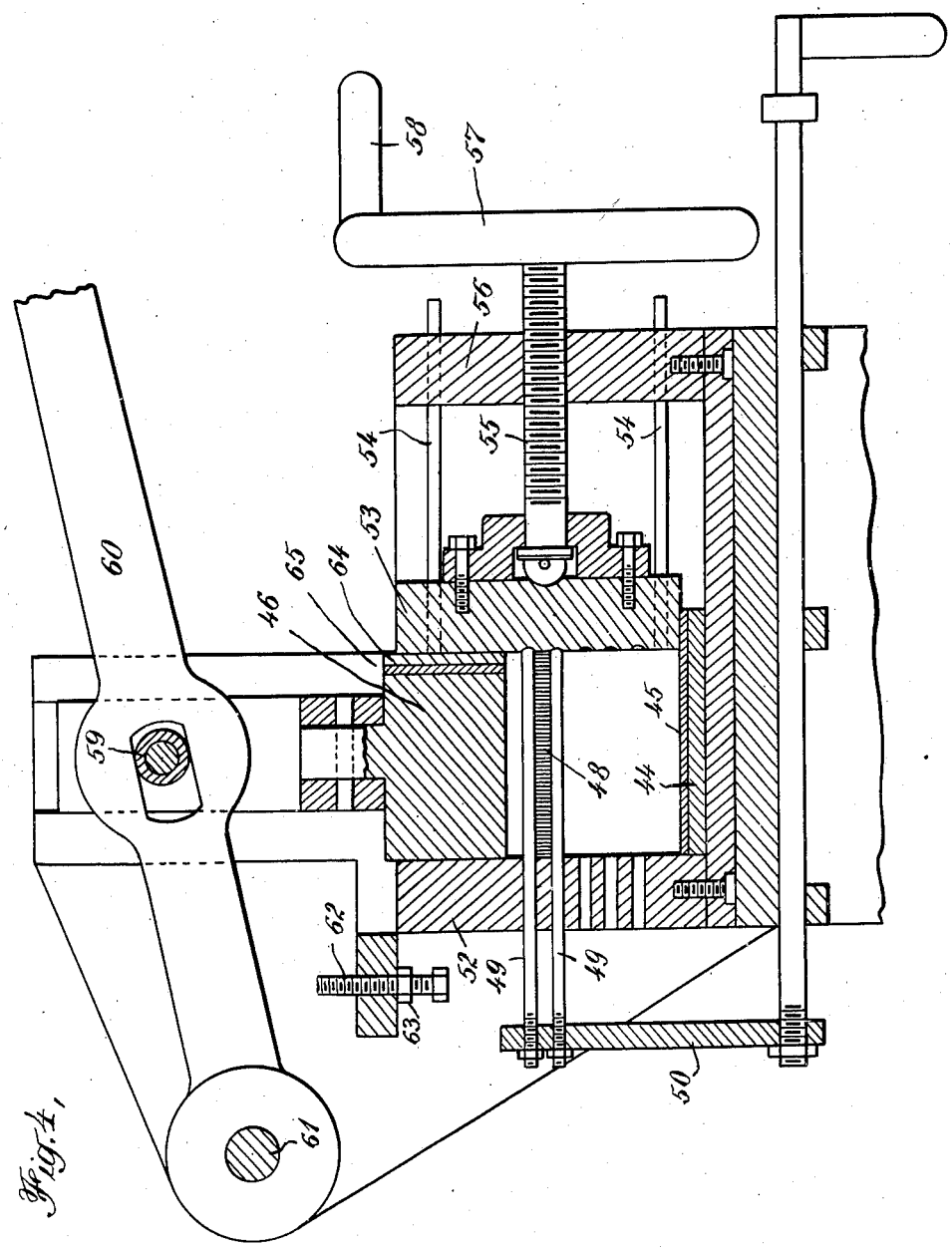
Fig. 4 is a sectional view of the die and pressure block of Fig. 3 taken on the line BB of Fig. 3.

Referring now to Fig. 4, the die 44 and the pressure block 46 are here shown in section. The left-hand wall 52 of the die is stationary and has holes through which the guide pins 49 supported on the plate 50 may be inserted. The right-hand wall 53 of the die is adjustably supported on slide rods 54 and is arranged to be adjusted by the screw 55 running through the stationary head 56 to compress the plaited blanks after they have been inserted in the die and while they are held in proper position by the guide pins 49, the screw 55 being actuated by the hand wheel 57 which has a crank handle 58. In a hand-operated machine the pressure block 46, guided by a suitable frame, not shown, is arranged to be moved up and down by means of a roller pin 59 actuated by an arm 60 pivoted on the pin 61. A stop screw 62 locked in position by check nut 63 may be adjusted to arrest the downward movement of the pressure block 46 when it has produced the required arcuation of the plaited blanks, indicated in Fig. 4 by numeral 48.

In operation, the plaited blank, compressed in the machine of Figs. 1 and 2, is inserted into the die 44 on the guide pins 49. The movable wall 53 of the die is then brought up to a position which will firmly compress the plaited blank against the opposite wall of the die. The guide pins 49 are then withdrawn and the pressure block 46 is advanced with a relatively slow motion so as to allow time for the fibers in the plaited material to move relatively to one another without breaking, thus permitting the material to stretch sufficiently to produce the arcuation and to give the material a permanent set in the arcuated form.

It will be observed that the die 44 and the pressure block 46 are arranged to accommodate a very considerable number of compressed plaits, more than would be required for a single completed article. For example, if the die and the pressure block shown in Fig. 3 are six inches in width, they will accommodate from 231 to 258 plaits of gum-impregnated 12½-point paper.

Several different numbers of plaits in the compressed blanks may be accommodated in the same die by providing blocks such as 64 and 65 rigidly attached to pressure block 46 to adjust the side-to-side dimension of the punch.

Since the plaited blanks are compressed by the adjustable side wall 53 so that the surfaces of adjacent plaits are in actual pressure contact with one another, as the pressure block 46 advances the plaits cannot wrinkle or buckle or become in any manner laterally deformed, with the result that as the pressure block 46 advances the plaits are arcuated, the arcuation beginning at the center of the blank and progressing gradually toward either end of the blank. By this means the paper or other material is allowed to gradually stretch, and also to gradually compress slightly along the concave edge, the result being a smooth and perfect arcuation of the plaits conforming with the curvature of the die and the pressure block.

After the plaited blanks have been arcuated they are removed from the die and are ready to be employed in the manufacture of lamp shades or to produce many other useful or decorative articles. Assuming that the arcuated blank produced by the die and pressure block of Fig. 4 contains more plaits than are required for a single article, the necessary number of plaits are sheared off and the arcuated blank is expanded, preferably by placing upon a heated table, bent around a suitable form, and the edges of the first and last plaits joined in any suitable manner.

Figure 5:
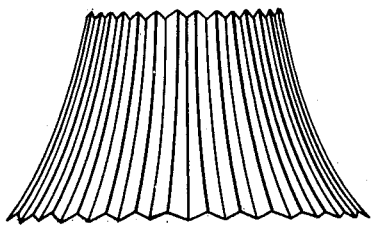
Figs. 5–11 show various forms of completed articles which may be made from the arcuately plaited material produced by my process using the machines shown in Figs. 1, 2, 3 and 4.
Figure 6:
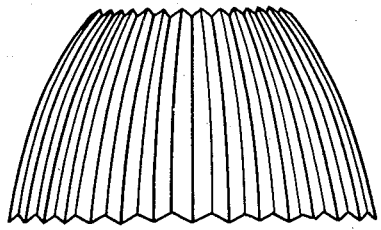
Figure 7:
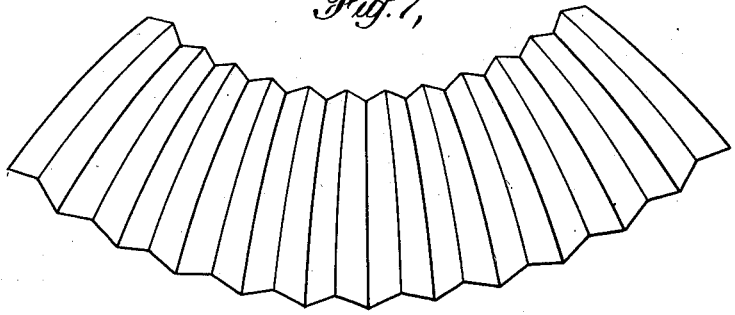

Figs. 5-11 are illustrative of various forms of arcuately plaited articles produced by the process above described. Figs. 5 and 6 show two forms of decorative lamp shades. In Fig. 5 the exterior surface of the shade is concave, while in Fig. 6 the exterior surface is convex. Fig. 7 illustrates the severed arcuately plaited blank from which the shade of either Fig. 5 or Fig 6 is made, depending upon which way the blank of Fig. 7 is wrapped around the form.

Figure 8:
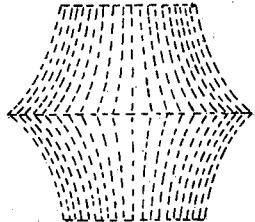

Figs. 8-11 show compound forms and serve to illustrate the wide range of shapes which may be secured. Fig. 8, for example, is produced by carefully opening and flattening out an arcuately plaited blank such as would be used for the shade of Fig. 5, scoring the blank lengthwise at right angles to the plaits, and then folding the blank along the scored line. The plaits are then gathered at the top and bottom to produce the form shown.

Figure 9:
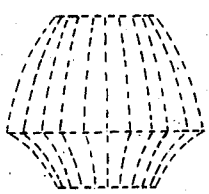
Figure 10:
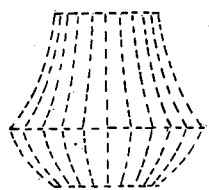

Figs. 9 and 10 are illustrative of forms produced by feeding folded paper to the straight-plaiting machine of Figs. 1 and 2 and then arcuating the folded plaits in the equipment of Figs. 3 and 4. In these two figures the lower portion of the shade has the same curvature as the upper part, and both curves are formed simultaneously in the arcuating die and pressure block, using the folded paper. After the folded paper has been arcuated, the blank is carefully expanded on a flat surface and the two halves of the fold carefully separated. In the forms shown in Figs. 9 and 10 the plaits in the lower portion are shorter than the plaits in the upper portion. This is accomplished by shearing off a portion of the plaits on one side of the blank after it has been expanded and unfolded. The upper portion in Fig. 9 has a convex external suface, while the lower portion has a concave external surface. In Fig. 10 the upper portion is concave, while the lower portion is convex. This difference is secured by wrapping the open blank one way or another around a form having a suitable shape.

In the case in which a folded double thickness of paper is used, it is treated in the arcuating equipment of Figs. 3 and 4 as though it were of only a single thickness. If necessary, the folded blank, before it is arcuated, may be scored with a suitable die along those lines on which it is desired that the bends shall take place when the arcuately plaited double blank is opened up. By this method of previous scoring a very regular pattern may be created along the opened fold.

Figure 11:
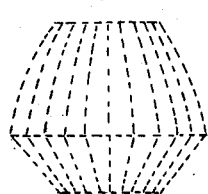

Fig. 11 shows a form in which one portion is arcuately plaited and another portion straight-plaited. This result may be secured by placing the compressed straight-plaited blank diagonally in the die of Fig. 3, as already explained, and by scoring the blank along the line which is to form the junction between the arcuate surface and the straight surface, so that the blank can be uniformly creased along this line in forming the complete article.

It will be understood that forms such as those shown in Figs. 5, 6, 8, 9, 10 and 11 may be employed not only in the manufacture of lamp and candle shades, but also in many other ways to produce useful or decorative articles for a variety of purposes.

A frame designed to hold the ends of the plaits in proper configuration, and made of metal or any other suitable material, may now be applied at either end of the plaits or at both ends. This frame may be cemented to the ends of the plaits or may be sewed or eyeletted or gripped in place so as to securely attach it to the plaits. This frame preferably includes means for attaching the completed device to the article with which it is to be used. In the case of a lamp shade, for example, the frame may be arranged to attach the shade to the lamp or the lamp fixture.

Because of the arcuation of the plaits, articles manufactured as disclosed herein possess a much higher strength than would similar articles made with straight-plaited materials. For example, using 12½-point gum-impregnated paper arcuately plaited with ⅜-inch plaits, it is unnecessary to provide any binding or stiffening device at the lower edge of the shade. The arcuately plaited paper possesses sufficient strength in itself to hold the shade in proper shape. Shades of this type are easily nested for shipment and are practically immune from damage during shipment.

If it is desired to produce plaits having rounded edges, the rollers 9 and 10 and 17 and 18 of Figs. 1 and 2 may be appropriately shaped, and the plaits may be interleaved with spacers of appropriate thickness before they are compressed. These spacers must be of a material which can be easily arcuated with the paper, and will preferably be of a material which can subsequently be straightened and reused. The machine of Figs. 1 and 2 can readily be arranged to automatically insert these spacers, the spacers remaining between the plaits until the completed blank is removed from the arcuating die.

It will be apparent that in the case of articles intended for decorative purposes, such as lamp shades, paper or other suitable material decorated in a selected pattern may be fed into the plaiting and arcuating equipment. On the other hand, the material may be first plaited and arcuated and then decorated by a variety of methods after it has been formed into the completed article. It is also possible to combine the two methods of decoration, for example, by using a colored or tinted material and then producing further decoration after the article has been completed.

Referring again to Fig. 3, it will be observed that I have shown the die and the pressure block as having a circular contour. Obviously, my process is not limited to circular contours, but I may also use elliptical or other shapes including reverse or S curves, the only requirement being that they contain no abrupt changes in curvature, since these would tend to create excessive strains in the material being arcuated and might therefore produce rupture of the material. Even this limitation, however, depends to a considerable extent upon the width of the plaits and the nature of the material being arcuated, since some materials are capable of more severe bending than other materials.

It is to be noted that by changing the height of the ridges on the straight-plaiting rollers 9 and 10 and 17 and 18 in Figs. 1 and 2, I may produce very narrow plaits or relatively wide plaits, the width of the plaits being accommodated by adjusting the distance between the table 14 and the member 16.

I have described my process with respect to sheet material in rolls, the width of the plaits being constant throughout their length. It will be understood, however, that the process may be modified within the scope of the invention to use sector blanks, the rollers 9 and 10 and 17 and 18 of Figs. 1 and 2 being tapered, and the ridges being of greater height at one end of the rolls than at the other end, the difference in diameter of the rolls being appropriately related to the radii of the sector blanks. These tapered straight plaits will then be compressed as hereinbefore described and will be arcuated in the same manner as are plaits of uniform width, except that the contours of the die 44 and pressure block 46 of Figs. 3 and 4 will be appropriately altered to allow for the varying thickness of the compressed plaited sector blanks. Articles made from such sector blanks, as for example lamp shades, may be arranged with the narrowest width of the plaits at the small-diameter end, thus producing a more interesting and decorative effect than can be secured with plaits of uniform width and avoiding an excessive amount of material at the small-diameter end.

It will be apparent that whether the completed article is to have an exterior surface of convex or concave configuration depends only upon the direction in which the arcuated blank is wrapped around the form. It will also be apparent that a particular plaited blank produced by the machines of Figs. 1, 2, 3 and 4 may be given various annular diameters within limits at either end, thus producing from a single type of arcuately plaited blank a number of different shapes of completed article. For example, the top of a lamp shade made with an arcuately plaited blank may be drawn into a very small circle so that the plaits at this point are almost as tightly compressed as they were while being arcuated. The other end of the arcuate plaits may be opened out so that they form a substantially smooth circle and may be held in this configuration by a metal band, thus producing a very flat shade of small vertical height. On the other hand, by using a relatively large number of arcuate plaits and by making the top and bottom diameters of the shade fairly large and nearly alike, a high steep-sided shape will be produced.

The process herein disclosed makes possible the production of a wide variety of new utilitarian and decorative articles, any and all of which will lie within the scope of my invention. Ingenious workers in the art will contrive numerous articles employing arcuately plaited sheet material many of which will not be directly suggested by my disclosures. While I have shown in Figs. 5–11 views of several forms of manufactured articles which can be produced by my process, it is understood that I am not to be limited to these forms. Also, while I have shown in Figs. 1, 2, 3 and 4 a means for carrying my process into effect, it is to be understood that I have illustrated but one of several mechanical means for carrying out my invention, and that I am not to be limited to any particular machine or device, but that the scope of my invention is determined only by the following claims.

It will be understood that when in this specification and in the claims I refer to sheet material or to sheet paper, I do not include within the meaning of either of these terms materials which are formed or molded into any desired shape, but I use these terms to indicate materials which are originally produced as true sheets. I am aware that articles similar in some respects to the arcuately plaited articles herein described and claimed, may be produced by felting various pulp materials directly upon screens or molds having the shape and configuration of the article to be produced. Such articles, however, do not comprise sheet material or sheet paper as such.

Having thus described my invention, what I claim is:

1. Process for the manufacture of arcuately plaited products which includes straight-plaiting a selected material, dividing the material into blanks containing a desired number of plaits, gathering and compressing said blanks, applying edgewise pressure to said blanks while compressed to arcuate said plaits, expanding the arcuately plaited blanks and forming them into said products.

2. Process for the arcuate plaiting of a selected material which includes straight-plaiting said material, dividing the material into blanks containing a desired number of plaits, gathering and compressing said blanks, and applying edgewise pressure to said blanks while compressed to arcuate said plaits.

3. A machine for giving to the normally straight plaits of a fabric a desired contour, including means for holding said plaits in contact, and compression means operating in line with the planes of said plaits to thereby give them the desired contour.

4. A machine for giving to the normally straight plaits of a fabric a desired arcuate contour, including means for holding said plaits in contact, and compression means operating in line with the planes of said plaits to thereby give them the desired arcuate contour.

5. Process for the manufacture of arcuately plaited products which includes placing a plaited blank having straight fold lines between parallel retaining surfaces, pressing the plaits of the blank tightly towards each other between said surfaces, supporting one fold-line surface of the pressed blank at locations spaced from each other longitudinally of the plaits, and applying pressure edgewise of the plaits on the other fold-line surface of the pressed blank and between said supporting locations, thereby moving the pressed blank on said retaining surfaces between said supporting locations and actuating the folded edges of the plaits of said pressed blank edgewise of said plaits.

6. Process for the manufacture of arcuately plaited products which includes placing a plaited blank having straight fold lines between parallel retaining surfaces, pressing the plaits of the blank tightly towards each other between said surfaces, and applying pressures to the opposite fold-line surfaces of the pressed blank and in directions substantially parallel with said retaining surfaces to arcuate the folded edges of said plaits.

7. Process for the manufacture of arcuately plaited products which includes placing a plaited blank having straight fold lines between parallel retaining surfaces, pressing the plaits of the blank tightly towards each other between said surfaces, applying pressure to the edges of the plaits on one fold-line surface of the pressed blank, and supporting the opposite fold-line surface of said pressed blank against movement at locations spaced from alignment with said applied pressure, thereby arcuating the folded edges of said plaits.

8. Process for arcuately plaiting selected material, which includes plaiting the material on straight fold lines to form a plaited blank, pressing the plaits of the blank closely towards each other, and applying pressures to the opposite fold-line surfaces of the blank while so pressed and at locations spaced from each other longitudinally of the plaits to arcuate the folded edges of said plaits.

9. Process for arcuately plaiting selected material, which includes plaiting the material on straight fold lines to form a plaited blank, pressing the plaits of the blank closely towards each other, applying pressures to the blank edgewise of the plaits to arcuate the folded edges of said plaits, and holding the plaits in said pressed condition during the arcuating operation.

10. The process of producing sheet material having plaits with edges of arcuate contour, which includes holding plaited material under lateral compression, and applying pressure to the folded edges of said plaits to arcuate said folded edges.

JOSEPH M. ANGELETTI.